United States Patent
Lee

(10) Patent No.: US 10,738,845 B2
(45) Date of Patent: Aug. 11, 2020

(54) MONOBLOCK BRAKE CALIPER AND MANUFACTURING METHOD THEREOF

(71) Applicants: SUNGWOO-AUTOTECH. CO., LTD., Chungcheongbuk-do (KR); Young Sik Lee, Gyeongsangbuk-do (KR)

(72) Inventor: Young Sik Lee, Gyeongsangbuk-do (KR)

(73) Assignees: SUNGWOO-AUTOTECH. CO., LTD., Chungcheongbuk-do (KR); Young Sik Lee, Gyeongsangbuk-do (KR)

(*) Notice: Subject to any disclaimer, the term of this patent is extended or adjusted under 35 U.S.C. 154(b) by 45 days.

(21) Appl. No.: 16/016,806

(22) Filed: Jun. 25, 2018

(65) Prior Publication Data
US 2019/0024733 A1    Jan. 24, 2019

(30) Foreign Application Priority Data
Jul. 19, 2017  (KR) .................. 10-2017-0091302

(51) Int. Cl.
| | |
|---|---|
| *B22D 19/00* | (2006.01) |
| *B22D 29/00* | (2006.01) |
| *F16D 65/00* | (2006.01) |
| *F16D 55/228* | (2006.01) |
| *F16D 55/00* | (2006.01) |
| *F16D 121/04* | (2012.01) |

(52) U.S. Cl.
CPC ......... *F16D 65/0068* (2013.01); *B22D 19/00* (2013.01); *F16D 55/228* (2013.01); *F16D 2055/0016* (2013.01); *F16D 2121/04* (2013.01); *F16D 2200/0004* (2013.01); *F16D 2250/0015* (2013.01)

(58) Field of Classification Search
CPC ..... B22D 19/00; B22D 29/00; F16D 65/0068; F16D 2055/0016
USPC .................................. 164/98, 137
See application file for complete search history.

(56) References Cited

U.S. PATENT DOCUMENTS 8,997,945 B1*  4/2015  Morais et al. ........ F16D 55/226
                                              188/71.1
9,890,824 B1*  2/2018  Jung ........................ B22C 9/02

FOREIGN PATENT DOCUMENTS

KR       10-1582277 B1     1/2016

* cited by examiner

*Primary Examiner* — Kevin P Kerns
(74) *Attorney, Agent, or Firm* — Rabin & Berdo, P.C.

(57) ABSTRACT

A monoblock brake caliper has a caliper body including an arcuate section in an arc shape to partially surround a brake disc, and a side section formed at both sides of the arcuate section and positioned in close proximity to both sides of the brake disc; a brake hydraulic line disposed inside the caliper body and configured to be insert-cast during the casting of the caliper body so as to be formed as a U-shaped pipe; and a metal core disposed on the inner side of the side section of the caliper body so as to be positioned adjoining the brake hydraulic line at a portion where a piston is to be disposed during the casting of the caliper body so that the metal core is removed from the caliper body after the casting of the caliper body to form a cylinder in the caliper body.

2 Claims, 4 Drawing Sheets

MONOBLOCK BRAKE CALIPER AND MANUFACTURING METHOD THEREOF

CROSS-REFERENCE TO RELATED APPLICATIONS

This application claims the benefit of Korean Patent Application No. 10-2017-0091302, filed on Jul. 19, 2017 in the Korean Intellectual Property Office, which is incorporated herein by reference in its entirety.

BACKGROUND OF THE INVENTION

1. Field of the Invention

The present disclosure relates to the molding and manufacture of a brake caliper for automobiles, and more particularly, to a monoblock brake caliper and manufacturing method thereof for the molding of a hydraulic line and a cylinder of the caliper.

2. Description of Related Art

In general, a disc brake device has a structure in which a hydraulic pressure generated from a master cylinder is transmitted to a cylinder in a brake caliper via a brake line to move a piston provided in the cylinder to cause brake pads to be actuated to create a braking force by the friction between the brake pads and a brake disc.

A floating caliper is featured in that a piston provided only on the inner side of a brake disc is moved to actuate one brake pad whereas a fixed caliper has a structure in which a plurality of pairs of pistons provided on the inner and outer sides of the brake disc are moved to actuate both brake pads.

Thus, the manufacture of the fixed caliper requires that a hydraulic pressure should be uniformly transmitted to a plurality of cylinders provided on the inner side of the brake disc, as well as should be simultaneously transmitted to a plurality of cylinders provided on the outer side of the brake disc at a uniform pressure. As a conventional technology for addressing this challenge, there is disclosed a brake caliper as shown in FIG. 1 in which a hydraulic line is separately mounted on the outside of the caliper allow the outside and the inside of the caliper to be operated in cooperation with each other, or the hydraulic line is disposed on the inside of the caliper to be cast using a core (i.e., a collapsible core) so as to be subjected to casting and molding so that the hydraulic line is formed in the caliper.

The above-mentioned process in which the hydraulic line is subjected to casting and molding to allow the hydraulic line to be formed in the caliper is disclosed in Korean Patent No. 10-1582277 (entitled "Method for Manufacturing Monoblock Brake Caliper for A Vehicle"), which is shown in FIG. 2.

In the method for manufacturing a monoblock brake caliper for a vehicle, brake hydraulic lines are provided on the inside of a caliper body, a brake hose fixing device is provided on the outside of the caliper body, and a plurality of cylinders are cast with a sand core. Prior to the casting process of forming the caliper body 10, the brake hydraulic lines 31, 32 and 33 are press-fitted into the sand core, and then the caliper body 10 is formed by being subjected to the casting process. The brake hose fixing device includes a brake hose fixing omnidirectional bolt that is fastened by turning to a thread groove formed on the caliper body 10 and has at least three concaved recesses formed on a top peripheral edge thereof so as to be spaced apart from each other at regular intervals, a brake hose seated on one of the concaved recesses of the brake hose fixing omnidirectional bolt, and a fixing nut configured to securely fix the brake hose fixing omnidirectional bolt and the brake hose by rotating the brake hose fixing omnidirectional bolt and the brake hose at the center thereof. The brake hydraulic lines 31, 32 and 33 are configured as first to third brake hydraulic lines, the first brake hydraulic line 31 is divided into a to-be-embedded portion and a to-be-cut portion relative to a reference line, respectively, at both ends thereof, and the to-be-cut portion serves to block a distal end of the first brake hydraulic line 31 prior to the casting process to prevent the introduction of a casting material. The reference line formed on the first brake hydraulic line has a groove concavely formed on the outer circumferential surface of the first brake hydraulic line at a depth where the first brake hydraulic line can be bent and cut with a worker's hands.

The problems involved in the use of the core are as follows.

First, because the hydraulic line is required to be coupled to the core for forming the cylinder to which the piston is to be inserted, its function may be lowered due to a damage of the core.

Second, when used, the core adsorbs moisture in the air, which causes casting defects in which bubbles are formed inside a caliper product and adversely affects elongation in the casting process.

Third, a separate process is required which breaks down and withdraws the core after the molding process. In this process, residues of the broken core may remain in the hydraulic line.

Fourth, a separate post-process is required which breaks down the core, and the core should be disposed separately as wastes that cannot be re-used.

Fifth, a finishing process of bending both ends of the brake hydraulic line must be performed to prevent the core from being introduced into the brake hydraulic line.

SUMMARY OF THE INVENTION

Accordingly, the present disclosure has been made to solve the aforementioned problems occurring in the prior art, and it is an object of the present disclosure to provide a monoblock brake caliper in which a U-shaped hydraulic pipe optimized through the design is seatingly disposed in a die before molding a caliper body and then a core designed to fit the shape of a cylinder to which a piston is assembled is seatingly disposed in the die so as to reduce a machining load, and a caliper body is formed by inset casting.

To achieve the above object, in one aspect, the present disclosure provides a monoblock brake caliper including: a caliper body 10 including an arcuate section 11 formed in an arc shape so as to partially surround a brake disc, and a side section 12 formed at both sides of the arcuate section 11 and positioned in close proximity to both sides of the brake disc, the arcuate section 11 and the side section 12 being integrally formed with each other by casting; a brake hydraulic line 20 disposed inside the caliper body 10 and configured to be insert-cast during the casting of the caliper body 10 so as to be formed as a U-shaped pipe; and a metal core 30 disposed on the inner side of the side section 12 of the caliper body 10 so as to be positioned adjoining the brake hydraulic line 20 at a portion where a piston 14 is to be disposed during the casting of the caliper body 10 so that the metal core 30 is removed from the caliper body 10 after the casting of the caliper body 10 to form a cylinder 13 in the caliper body.

In the monoblock brake caliper of the present disclosure, an adjoining portion between the brake hydraulic line 20 and the cylinder 13 formed by the metal core 30 may be subjected to a cutting process so that the brake hydraulic line 20 and the cylinder 13 fluidically communicate with each other.

In the monoblock brake caliper of the present disclosure, the brake hydraulic line 20 may be insert-cast in the caliper body 10 with a filling material filled in the brake hydraulic line 20, and the filling material may be removed from the brake hydraulic line 20 after the caliper body has been cooled and cured.

In the monoblock brake caliper of the present disclosure, the heat transfer coefficient of the brake hydraulic line 20 may be larger than that of the caliper body 10.

In the monoblock brake caliper of the present disclosure, the brake hydraulic line 20 may include a metal coating layer formed on the outer surface thereof, the metal coating layer having a heat transfer coefficient larger than that of the brake hydraulic line 20.

In another aspect, the present disclosure provides a method for manufacturing a monoblock brake caliper, the method including: a first step of forming a brake hydraulic line 20 formed as a U-shaped pipe; a second step of disposing a brake hydraulic line 20 inside a die where a caliper body 10 including an arcuate section 11 formed in an arc shape so as to partially surround a brake disc, and a side section 12 formed at both sides of the arcuate section 11 and positioned in close proximity to both sides of the brake disc is to be formed, the brake hydraulic line 20 being formed so as to be inserted into the to-be-formed caliper body 10; a third step of disposing a metal core 30 in the die in such as manner as to be mounted on the inner side of the side section 12 of the caliper body 10 so as to be positioned adjoining the brake hydraulic line 20 at a portion where a piston 14 is to be disposed during the casting of the caliper body 10; a fourth step of casting the caliper body 10 to allow the brake hydraulic line 20 disposed in the die to be inserted into the caliper body 10 and allow a cylinder to which the piston is to be inserted to be formed by a metal core 30; a fifth step of removing the die and the metal core from the cast caliper body 4410; and a sixth step of subjecting an adjoining portion between the cylinder 13 formed by the removed metal core 30 and the brake hydraulic line 20 to a cutting process so that the brake hydraulic line 20 and the cylinder 13 fluidically communicate with each other.

In the method for manufacturing a monoblock brake caliper of the present disclosure, the method may further include: a step of filling a filling material in the brake hydraulic line 20 either before the second step or between the second step and the third step; and a step of removing the filling material from the brake hydraulic line 20 after the caliper body 10 cast in the fourth step has been cured.

Effects of the Invention

According to the monoblock brake caliper of the present disclosure as constructed above, the brake hydraulic line is formed by insert casting in the caliper body so that the brake hydraulic line and the caliper body are integrally formed with each other, thereby preventing a damage of the brake hydraulic line.

In addition, in the case of the conventional inner molding process using the core, a hydraulic line with an appropriate inner diameter (ranging from 2 to 5 mm) cannot be formed, making it impossible to design the caliper products suitable for optimization of the performance of the brake. However, the monoblock brake caliper of the present disclosure has an advantage in that the brake hydraulic line is formed by insert casting during the casting of the caliper body so that a hydraulic line with an appropriate inner diameter can be formed and the brake response performance can be improved.

In addition, in the case of the conventional inner molding process using the core, the core adsorbs moisture in the air, which causes casting defects in which bubbles are formed inside a caliper product and adversely affects elongation in the casting process. However, the monoblock brake caliper of the present disclosure eliminates the necessity for the application of the conventional sand core during the casting of the caliper body, thereby solving the above-mentioned problem.

Further, unlike the conventional monoblock brake caliper manufacturing method that requires a separate process of having to break down and withdraw the core after the molding process, the monoblock brake caliper manufacturing method according to the present disclosure has an advantage in that it does not require separate processes including the air blowing performed to internally clean the hydraulic line and the ball test performed to examine whether or not sand residues still remain in the hydraulic line because residues of the broken core do not remain in the hydraulic line.

Moreover, the monoblock brake caliper manufacturing method according to the present disclosure has an advantage in that the metal core is used to form the cylinder to which the piston is to be coupled so that a separate post-process is not required and the metal core can be re-used.

BRIEF DESCRIPTION OF THE DRAWINGS

The above and other objects, features and advantages of the present disclosure will be apparent from the following detailed description of the preferred embodiments of the invention when taken in conjunction with the accompanying drawings, in which.

EXPLANATION ON SYMBOLS

Figure 1:
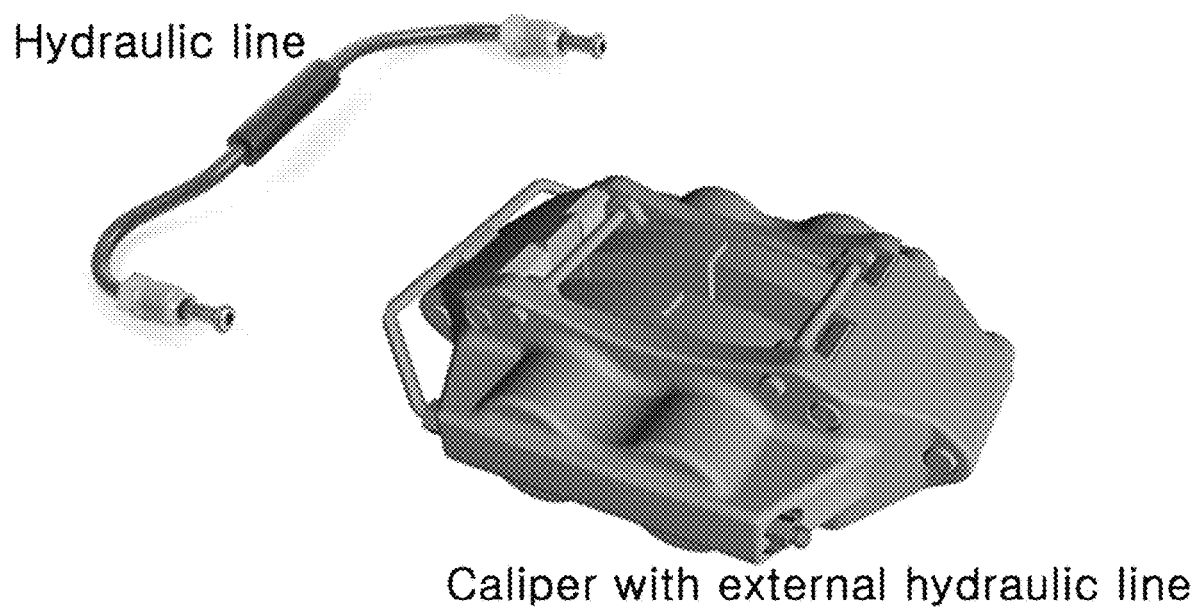
FIG. 1 is a top perspective view showing a brake caliper according to the prior art.
Figure 2:
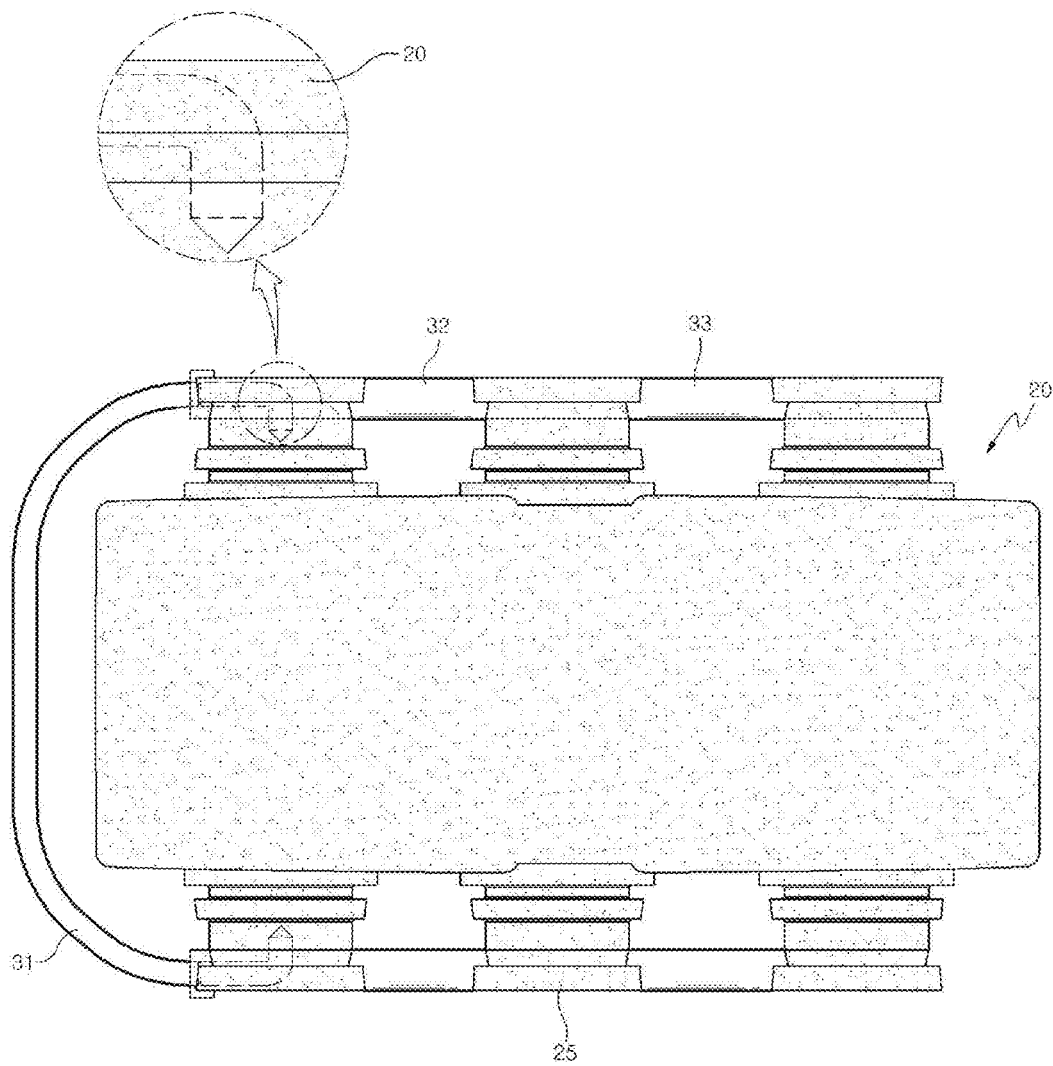
FIG. 2 is a view showing a method for manufacturing a conventional monoblock brake caliper for vehicles.

10: caliper body
11: arcuate section
12: side section
13: cylinder
14: piston
20: brake hydraulic line
25: air bleeder
30: metal core

DETAILED DESCRIPTION OF THE PREFERRED EMBODIMENTS

Hereinafter, a monoblock brake caliper and manufacturing method thereof according to the present disclosure will be described in detail with reference to the accompanying drawings.

Figure 3:
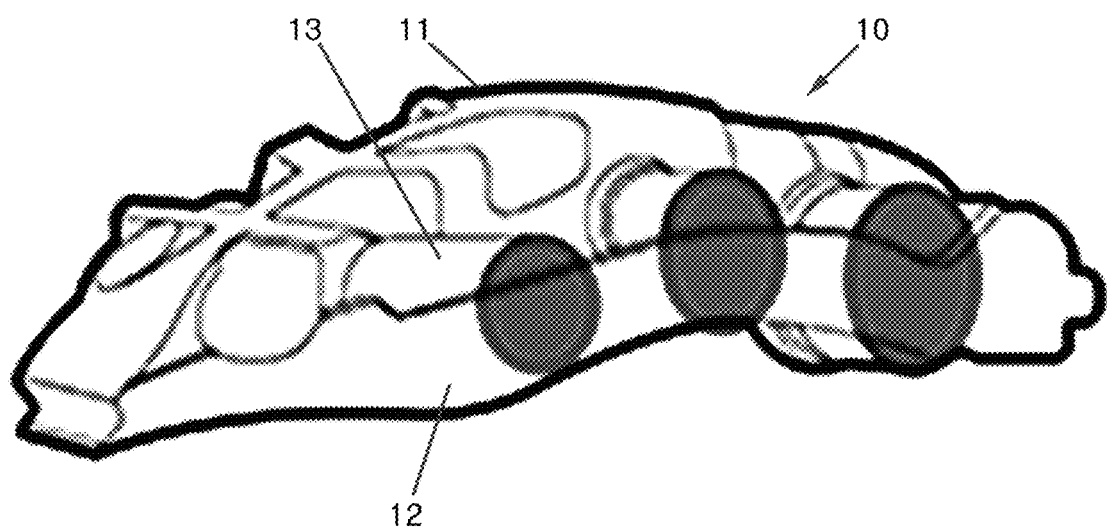
FIG. 3 is a top perspective view showing a caliper body of a monoblock brake caliper according to the present disclosure.
Figure 4:
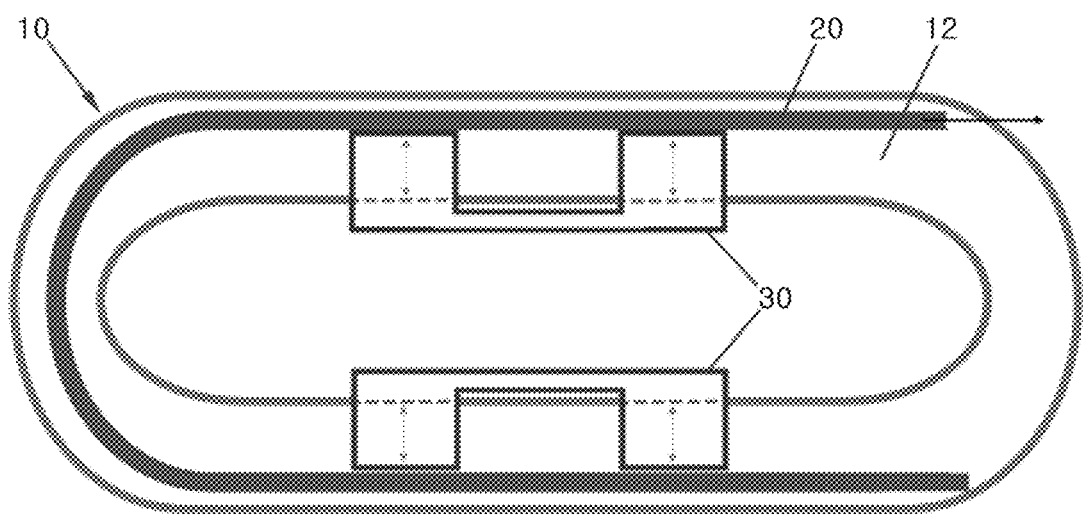
FIG. 4 is a view showing a structure for manufacturing a monoblock brake caliper according to the present disclosure.
Figure 5:
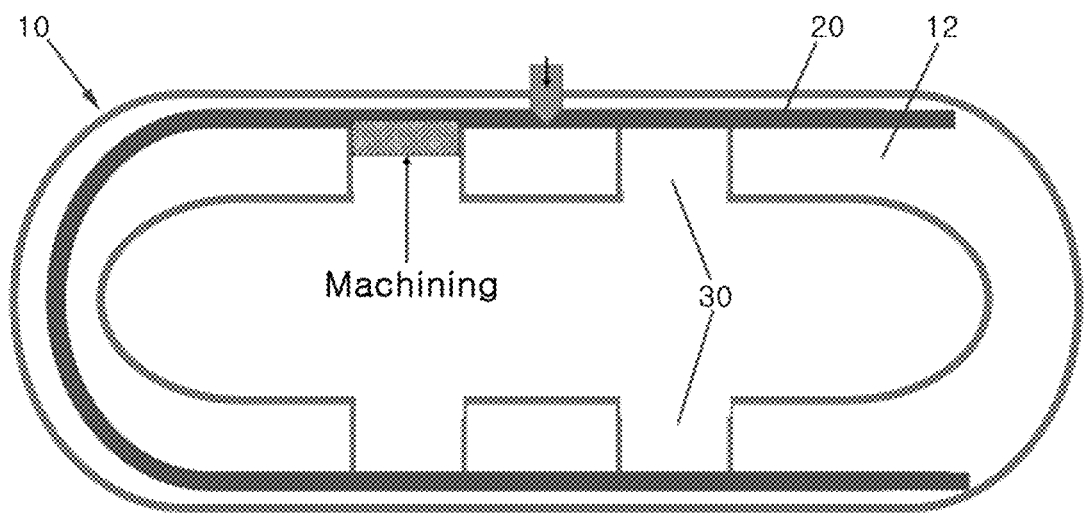
FIG. 5 is a view a state in which a piston passage is machined after insert-casting a monoblock brake caliper according to the present disclosure.
Figure 6:
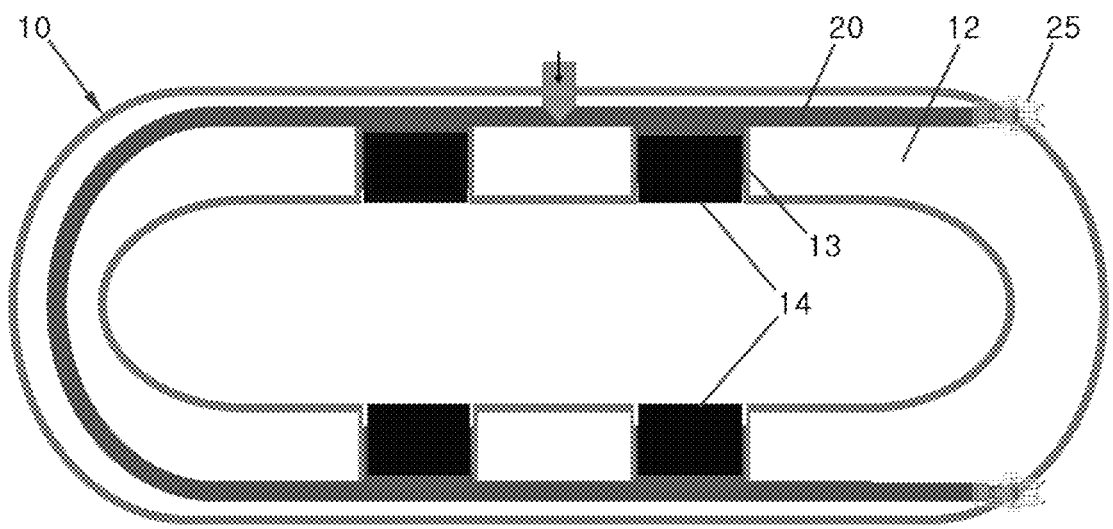
FIG. 6 is a view showing an assembled state of an air bleeder for bleeding air from a monoblock brake caliper according to the present disclosure.

FIG. 3 is a top perspective view showing a caliper body of a monoblock brake caliper according to the present disclosure, FIG. 4 is a view showing a structure for manufacturing a monoblock brake caliper according to the present disclosure, FIG. 5 is a view a state in which a piston passage is machined after insert-casting a monoblock brake caliper according to the present disclosure, and FIG. 6 is a view showing an assembled state of an air bleeder for bleeding air from a monoblock brake caliper according to the present disclosure.

A brake is operated based on the principle that it slows down or stops a moving vehicle by means of the frictional force of the brake pads, exerted on the rotating surface of a brake disc. In this case, a caliper is used to withdraw a piston by the pressure generated by the supply of brake oil to allow the brake pads to abut against the brake disc.

The monoblock brake caliper according to the present disclosure includes a caliper body 10, a brake hydraulic line 20, and a metal core 30.

The caliper body 10, as shown in FIG. 3, includes an arcuate section 11 formed in an arc shape so as to partially surround a brake disc, and a side section 12 formed at both sides of the arcuate section 11 and positioned in close proximity to both sides of the brake disc, the arcuate section 11 and the side section 12 being integrally formed with each other by casting. The caliper body 10 is made of a metal material. A cylinder 13 is formed at the side section 12 to allow the piston 14 to be coupled thereto.

The brake hydraulic line 20 is disposed inside the caliper body 10 and is insert-cast during the casting of the caliper body 10 so as to be formed as a U-shaped pipe. The brake hydraulic line 20 is also made of a metal material.

Further, the monoblock brake caliper according to the present disclosure is configured such that the brake hydraulic line 20 is insert-cast during the casting of the caliper body 10 to manufacture a caliper in which the brake hydraulic line 20 and the caliper body 10 are integrally formed with each other, thus eliminating the necessity for removing casting sand, unlike a conventional brake caliper in which a brake hydraulic line is formed of casting sand. Moreover, the monoblock brake caliper according to the present disclosure enables selection and application of various kinds of the brake hydraulic lines with an inner diameter ranging from 2 to 5 mm, which are optimized for all vehicles from small vehicles to large vehicles so that caliper products for optimization of the performance of the brake can be designed, unlike the conventional brake caliper in which the brake hydraulic line is formed of casting sand, leading to an increase in the diameter of the brake hydraulic line and thus to a decrease in the performance of the brake As such, the monoblock brake caliper according to the present disclosure has an advantage in that the brake hydraulic line is formed by insert casting during the casting of the caliper body so that a hydraulic line with an appropriate inner diameter can be formed and the brake response performance can be improved.

The metal core 30, as shown in FIG. 4, is disposed on the inner side of the side section 12 of the caliper body 10 and is mounted at a portion where a piston 14 is to be disposed during the casting of the caliper body 10 so as to be positioned adjoining the brake hydraulic line 20 so that the metal core 30 is removed from the caliper body 10 after the casting of the caliper body 10 to form the cylinder 13 in the caliper body 10.

The piston is coupled to the inside of one side or the insides of both sides of the side section 12 of the caliper body 10 to allow the brake pads to abut against the brake disc owing to the withdrawal of the piston by the supply of brake oil, which is involved in the braking operation. Generally, the piston is coupled to the insides of both sides of the side section 12 of the caliper body 10.

The metal core 30 is used to form the cylinder 13 to which the piston 14 is to be coupled, and has an advantage in that a separate post-process is not required and the metal core 30 can be re-used, unlike a conventional brake caliper that employs a core.

In this case, the metal core 30 is generally provided in two pairs or three pairs, but the scope of the present disclosure is not limited thereto and the metal core 30 is provided such that the two or three pairs of metal cores are connected to each other.

After the cylinder 13 to which the piston 14 is to be coupled is formed by the metal core 30 which is in turn removed, an adjoining portion between the brake hydraulic line 20 and the cylinder 13 formed by the metal core 30 is subjected to a cutting process so that the brake hydraulic line 20 and the cylinder 13 fluidically communicate with each other. When brake oil is supplied to the brake hydraulic line 20, the piston is withdrawn from the cylinder to cause the brake pads to abut against the brake disc, which is involved in the braking operation.

In this case, the brake hydraulic line 20 is formed in a U shape as shown in FIGS. 4 to 6.

An air bleeder 25 is coupled to the brake hydraulic line 20 to bleed air present inside the brake hydraulic line 20 during the supply of the brake oil to the inside of the brake hydraulic line 20 or during the use of when the brake hydraulic line 20.

In the case where the brake hydraulic line 20 is formed in a U shape, it is required that the air bleeder 25 should be provided in one pair.

Besides, the monoblock brake caliper of the present disclosure enables the rapid discharge of heat through the inside of the brake hydraulic line 20 because the brake hydraulic line is formed of a metal material during the casting of the caliper body 10 so that the rapid cooling operation is performed around the brake hydraulic line 20. For this reason, there occurs a difference in the shrinkage rate due to a cooling rate difference between a peripheral portion of the brake hydraulic line 20 and a portion other than the peripheral portion, resulting in a high risk of occurrence of a crack in the brake hydraulic line 20.

Accordingly, the monoblock brake caliper of the present disclosure further include a filling material in the caliper body 10 so as to be filled in the brake hydraulic line 20 during the insert-casting of the brake hydraulic line 20 in order to prevent the occurrence of a crack due to the difference in the shrinkage rate caused by the cooling rate difference. In this case, the filling material used in the present disclosure is preferably a metal filling material taking the shape of a bead which is easy to remove from the brake hydraulic line 20 by tilting the caliper body 10.

The brake hydraulic line 20 is insert-cast in the caliper body 10 with a filling material filled in the brake hydraulic line 20, and the filling material is removed from the brake hydraulic line 20 after the caliper body has been cooled and cured.

In a state in which the filling material has been filled in the brake hydraulic line 20 during the insert-casting of the brake hydraulic line 20, when the caliper body 10 is subjected to a casting process, heat is not discharged rapidly from the inside of the brake hydraulic line 20 so that the caliper body 10 can be cooled at a uniform rate, thereby preventing the occurrence of the crack due to the difference in the shrinkage rate caused by the cooling rate difference and the separation of the brake hydraulic line 20 from the housing body.

Preferably, the heat transfer coefficient of the brake hydraulic line 20 is larger than that of the caliper body 10.

The reason for this is that when the caliper body 10 is cooled after being cast, heat is transferred to a portion where the brake hydraulic line 20 is disposed inside the caliper body and is discharged slowly because the filling material is filled in the brake hydraulic line 20. Resultantly, a relatively thicker portion of the caliper body 10 other than a portion where the brake hydraulic line 20 is disposed is first cooled, and a relatively thinner portion of the caliper body 10, where the brake hydraulic line 20 is disposed, is cooled later so that the cooling of the caliper body 10 is uniformly performed wholly.

Further, more preferably, the brake hydraulic line 20 includes a metal coating layer formed on the outer surface thereof. The metal coating layer has a heat transfer coefficient larger than that of the brake hydraulic line 20. When the metal coating layer having a heat transfer coefficient larger than that of the brake hydraulic line 20 is formed on the outer surface of the brake hydraulic line 20, the heat discharge can be performed more smoothly during the cooling of the caliper body 10 and the adhesion force between the brake hydraulic line 20 and the caliper body 10 can be increased.

A method for manufacturing the monoblock brake caliper of the present disclosure will be described hereinafter.

First, a brake hydraulic line 20 is disposed inside a die where a caliper body 10 including an arcuate section 11 formed in an arc shape so as to partially surround a brake disc, and a side section 12 formed at both sides of the arcuate section 11 and positioned in close proximity to both sides of the brake disc is to be formed, the brake hydraulic line 20 being formed in a pipe shape so as to be inserted into the to-be-formed caliper body 10.

Subsequently, a metal core 30 is disposed in the die in such as manner as to be mounted on the inner side of the side section 12 of the caliper body 10 so as to be positioned adjoining the brake hydraulic line 20 at a portion where a piston 14 is to be disposed during the casting of the caliper body 10.

Next, the caliper body 10 is cast to allow the brake hydraulic line 20 disposed in the die to be inserted into the caliper body 10 and allow a cylinder to which the piston is to be inserted to be formed by a metal core 30.

In this case, preferably, a filling material is filled in the brake hydraulic line 20 before either the step of disposing the brake hydraulic line 20 or the step of disposing the metal core 30 in the die.

Subsequently, the die and the metal core are removed from the cast caliper body 11.

In the case where the filling material is filled in the brake hydraulic line 20, the filling material is removed from the brake hydraulic line 10 after the cast caliper body 20 has been cured.

Then, an adjoining portion between the cylinder 13 formed by the removed metal core 30 and the brake hydraulic line 20 is subjected to a cutting process so that the brake hydraulic line 20 and the cylinder 13 fluidically communicate with each other.

Further, the brake hydraulic line 20 is formed as a U-shaped pipe.

In addition, preferably, the heat transfer coefficient of the brake hydraulic line 20 is larger than that of the caliper body 10.

Moreover, preferably, the brake hydraulic line 20 includes a metal coating layer formed on the outer surface thereof. The metal coating layer has a heat transfer coefficient larger than that of the brake hydraulic line 20.

The technical spirit of the present disclosure should not be construed by limiting the present disclosure to the above-mentioned embodiments. The application range thereof is of course varied, and various modifications thereof may be made by those skilled in the art without departing from the gist of the present disclosure. Therefore, as long as these modifications and changes are apparent to those skilled in the art, they are included in the protective scope of the present disclosure.

What is claimed is:

1. A method for manufacturing a monoblock brake caliper, the method comprising:
   a first step of forming a brake hydraulic line (20) formed as a U-shaped pipe;
   a second step of disposing the brake hydraulic line (20) inside a die where a caliper body (10) including an arcuate section (11) formed in an arc shape so as to partially surround a brake disc, and a side section (12) formed at both sides of the arcuate section (11) and positioned in proximity to both sides of the brake disc is to be formed, the brake hydraulic line (20) being formed so as to be inserted into the to-be-formed caliper body (10);
   a third step of disposing a metal core (30) in the die in such as manner as to be mounted on an inner side of the side section (12) of the caliper body (10) so as to be positioned adjoining the brake hydraulic line (20) at a portion where a piston (14) is to be disposed during casting of the caliper body (10);
   a fourth step of casting the caliper body (10) to allow the brake hydraulic line (20) disposed in the die to be inserted into the caliper body (10) and allow a cylinder to which the piston is to be inserted to be formed by a metal core (30);
   a fifth step of removing the die and the metal core (30) from the cast caliper body (10); and
   a sixth step of subjecting an adjoining portion between the cylinder (13) formed by the removed metal core (30) and the brake hydraulic line (20) to a cutting process so that the brake hydraulic line (20) and the cylinder (13) fluidically communicate with each other.

2. The method according to claim 1, further comprising:
   a step of filling a filling material in the brake hydraulic line (20) either before the second step or between the second step and the third step; and
   a step of removing the filling material from the brake hydraulic line (20) after the caliper body (10) cast in the fourth step has been cured.

* * * * *